UNITED STATES PATENT OFFICE.

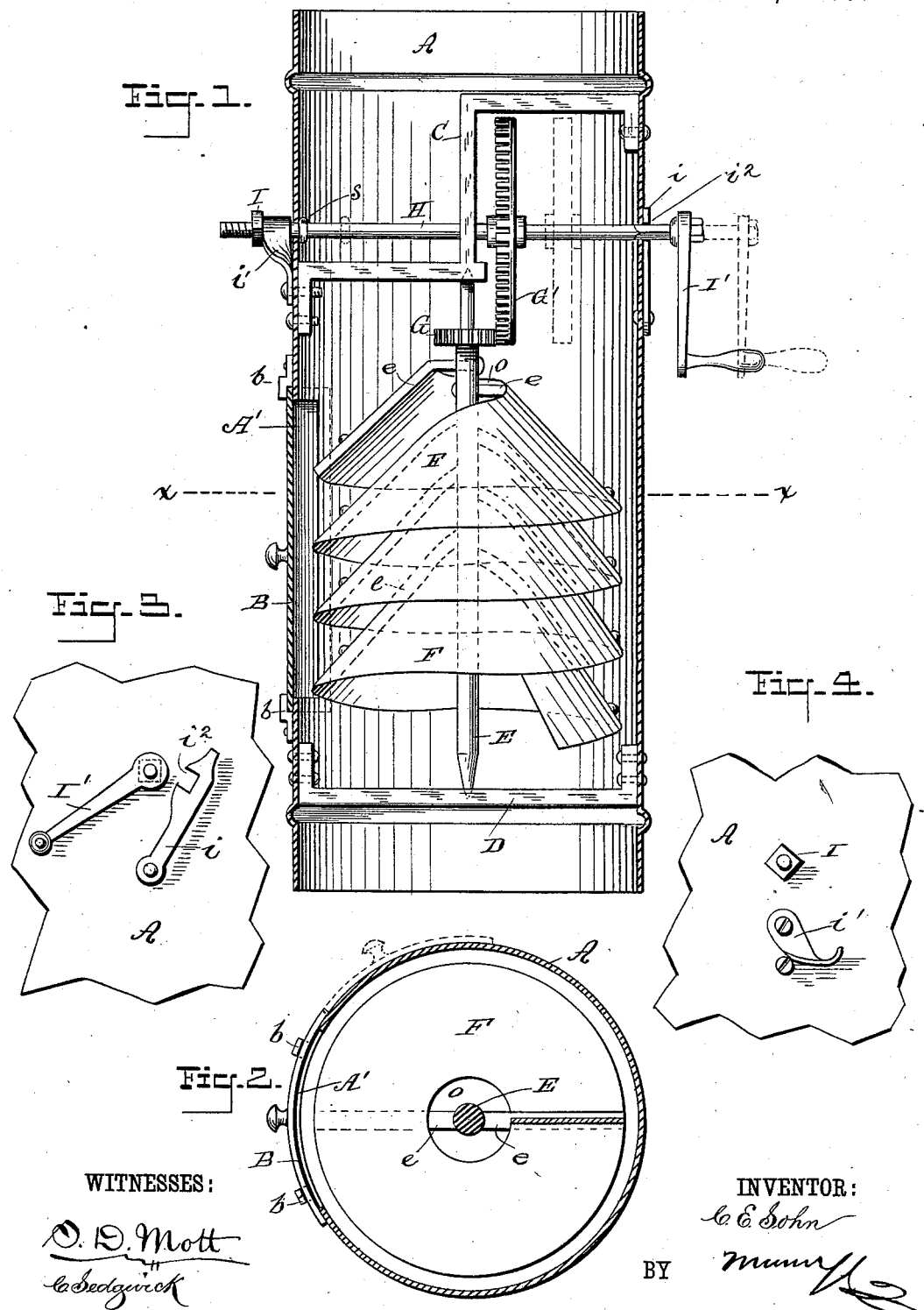

CHARLES E. SOHN, OF SPRINGFIELD, OHIO.

DAMPER FOR STOVE-PIPES, CHIMNEYS, &c.

SPECIFICATION forming part of Letters Patent No. 358,172, dated February 22, 1887.

Application filed October 28, 1886. Serial No. 217,407. (No model.)

*To all whom it may concern:*

Be it known that I, CHARLES E. SOHN, of Springfield, in the county of Clark and State of Ohio, have invented a new and Improved Damper for Stove-Pipes, Chimneys, &c., of which the following is a full, clear, and exact description.

The invention consists in the peculiar construction and arrangement of parts, all as hereinafter fully described, and pointed out in the claims.

Reference is to be had to the accompanying drawings, forming a part of this specification, in which similar letters of reference indicate corresponding parts in all the figures.

Figure 1 represents a vertical section of a stove-pipe or stack, showing, in elevation, my invention applied thereto. Fig. 2 is a cross-section of Fig. 1 on the line $x\ x$, showing an opening through which the hand may be inserted in cleaning the several parts of my invention. Fig. 3 is a detail of a locking device which is used when it is desired to prevent the rotation of the spiral plate or screw-propeller. Fig. 4 is another detail to be referred to.

A represents an ordinary stove-pipe, which is provided with an opening, A', and a suitable cover, B. (Shown in this instance as a slide working in guides $b\ b$ on the pipe A.)

C and D represent two cross-pieces riveted or otherwise fastened to the pipe A on the inside. These cross-pieces form bearings for the upper and lower tapered ends of a vertical rod, E, which is provided with a series of lateral inclined arms, $e$, as shown in Fig. 1.

The arms $e$ have fastened to them in any desired or convenient manner a plate, F, which is wound around the vertical rod E, so as to form a cone-shaped spiral or screw propeller, which nearly fills the interior of the pipe A. This plate F is made of material capable of resisting the action of extreme heat, and is of such diameter when in its operative form as to leave a sufficient space between its outer edge and the face of the pipe to permit of its easy and free movement in the pipe. The plate F is so formed that when in position upon the vertical rod E a central opening, $o$, is provided, which permits the exit of the products of combustion.

Upon the upper end of the vertical rod E is placed a small pinion, G, which intermeshes with a somewhat larger gear-wheel, G', securely held upon a horizontal shaft, H, which has its bearings in the pipe A, formed by piercing two holes in the pipe and passing the ends of the said shaft H through these holes, as shown in the drawings.

One end of the shaft H is tapped or screw-threaded to receive upon it a nut or washer, I, and the other end is squared and receives upon it a suitable crank, I'.

The pipe A is provided with two latches, $i$ $i'$, the latch $i$ being provided with a recess, $i^2$, to correspond in size with the squared end of the shaft H, so that when no movement of the damper is desired this latch may be moved to have its recess engage with the squared end of the said shaft, all movement of the shaft being thus effectually prevented. The latch $i'$ is provided for the purpose of preventing lateral movement of the shaft H, which is effected by allowing its free end to drop between the nut or washer I and the face of the pipe A. This latch also serves, when in this position, to keep the pinion G and the gear-wheel G' in engagement with each other. By raising the latch $i'$ from contact with the shaft H, as in Fig. 4, the said shaft may be moved as far as the stop S, and as shown in dotted lines, Fig. 1, so as to separate the gear-wheel G' from the pinion G, in which position the damper is free to move by the action of the heat and products of combustion in passing through the pipe by the natural draft through the chimney or pipe A.

In cases where insufficient draft exists in the pipe A, or when it is desired to start a fire or necessary to increase the draft, the latch $i$ is raised from its contact with the shaft H, as shown in Fig. 3, and while the remaining parts are in the position shown in full lines in Fig. 1 the crank is turned, which moves the gear-wheel G', and causes the vertical rod and its attached spiral or screw propeller to revolve rapidly, thus creating a suction and forcing the products of combustion quickly up out of the pipe A, thereby increasing the draft of the pipe or chimney.

When it is desired to check the draft, the latch $i$ is made to engage the shaft H, in which position the parts are held stationary, and the smoke will slowly pass up through the spiral or propeller and out of the chimney.

In cases where my invention is to be applied to large smoke-stacks or other desired places, I intend to substitute for the crank a pulley, which can be rotated by belt and power, or in any desired manner.

The opening A is intended to be of sufficient size to admit of the cleaning of the spiral or propeller F and other parts should it become necessary.

It will be obvious that when the spiral or screw propeller F is locked and its rotation prevented, the exit of the products of combustion will be checked in their passage through the propeller F, and in consequence of this resistance a great deal of the heat that is now carried up the pipe or chimney and wasted will be saved and fuel economized. When the spiral or screw propeller is left free to rotate in the pipe or chimney A, as shown in dotted lines, Fig. 1, the apparatus will still serve to check the flow of the products of combustion, but to a somewhat less degree than in the instance described, where the propeller is prevented from moving. It will also be obvious that from the simplicity of the construction of my invention it can be cheaply made, and that its liability to get out of order is very slight; and yet it forms an effective damper, by which the draft is regulated, and also furnishes a convenient and effective mode of accelerating the fire and increasing the draft of the pipe or chimney when required.

My invention embraces three very convenient functions: first, the propeller when locked serves to lessen the draft of the chimney; second, when the propeller is left free to be revolved by the products of combustion, the draft of the chimney is a little obstructed; third, when power is imparted to the propeller, the draft will be increased in proportion to the velocity given to the propeller. My invention forms a damper, heat-arrester, and smoke-conveyer combined.

Having thus described my invention, what I claim as new, and desire to secure by Letters Patent, is—

1. The combination, with a stove-pipe, of a vertical rod journaled therein and provided with a pinion, a spiral worm secured upon the said rod, a sliding horizontal shaft provided with a gear-wheel engaging the pinion, and means for revolving and locking the said shaft, substantially as herein shown and described.

2. The combination, with a stove-pipe, of a vertical rod journaled therein and provided with a pinion, a spiral worm having an open upper end, a sliding horizontal shaft provided with a gear-wheel engaging the pinion, a catch engaging the shaft to prevent endwise movement, a catch engaging the shaft to prevent rotation, and means for revolving said shaft, substantially as herein shown and described.

3. In a damper, the combination, with the spiral F, gear-wheel G, crank-shaft H, provided with gear-wheel G', stop S, and nut I, of the latches $i\ i'$, vertical rod E, and crosspieces C D, substantially in the manner and for the purposes specified.

CHARLES E. SOHN.

Witnesses:
M. T. BURNHAM,
J. J. MILLER.